United States Patent
Miwa

(10) Patent No.: US 9,755,257 B2
(45) Date of Patent: Sep. 5, 2017

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventor: Hiromichi Miwa, Yokohama (JP)

(73) Assignee: Nissan Motor Co., Ltd., Yokohama-si, Kanagawa (JP)

( * ) Notice: Subject to any disclaimer, the term of this patent is extended or adjusted under 35 U.S.C. 154(b) by 0 days.

(21) Appl. No.: 14/400,613

(22) PCT Filed: Apr. 5, 2013

(86) PCT No.: PCT/JP2013/060475
§ 371 (c)(1),
(2) Date: Nov. 12, 2014

(87) PCT Pub. No.: WO2013/187110
PCT Pub. Date: Dec. 19, 2013

(65) Prior Publication Data
US 2015/0140459 A1    May 21, 2015

(30) Foreign Application Priority Data
Jun. 13, 2012 (JP) ................................ 2012-133539

(51) Int. Cl.
| | |
|---|---|
| *H01M 8/06* | (2016.01) |
| *H01M 8/0606* | (2016.01) |
| *H01M 8/0612* | (2016.01) |
| *H01M 8/04701* | (2016.01) |
| *H01M 8/04007* | (2016.01) |
| *H01M 8/124* | (2016.01) |
| *H01M 8/04746* | (2016.01) |

(52) U.S. Cl.
CPC ..... *H01M 8/0606* (2013.01); *H01M 8/04067* (2013.01); *H01M 8/04731* (2013.01);
(Continued)

(58) Field of Classification Search
CPC ........... H01M 2008/1293; H01M 8/04; H01M 8/04067; H01M 8/04731; H01M 8/04738;
(Continued)

(56) References Cited

U.S. PATENT DOCUMENTS

| | | | |
|---|---|---|---|
| 6,306,532 B1* | 10/2001 | Kurita et al. ................. | 429/413 |
| 2002/0092287 A1* | 7/2002 | Logvinov ......... | H01M 8/04014 60/39.6 |

(Continued)

FOREIGN PATENT DOCUMENTS

| | | |
|---|---|---|
| JP | 03-064865 A | 3/1991 |
| JP | H07050171 A | 2/1995 |

(Continued)

OTHER PUBLICATIONS

Machine translation for JP2006-302660.*

*Primary Examiner* — Nicholas P D'Aniello
*Assistant Examiner* — Ling R Zeng
(74) *Attorney, Agent, or Firm* — Young Basile Hanlon & MacFarlane, P.C.

(57) ABSTRACT

The cooling capacity of a first heat exchanger for cooling a reformed gas introduced into an inlet of a circulation pump is increased as an output of a fuel cell increases. With this configuration, an inlet temperature of the circulation pump is relatively high during low power generation and decreases as the generation power increases, and a volumetric flow rate during high power generation in which a large amount of reformed gas is required can be decreased relatively. As the result, a dynamic range required for the circulation pump can be made small. Furthermore, water condensation in the inlet of the circulation pump can be prevented during low power generation.

12 Claims, 5 Drawing Sheets

(52) U.S. Cl.
CPC ..... *H01M 8/04738* (2013.01); *H01M 8/0618* (2013.01); *H01M 8/04753* (2013.01); *H01M 2008/1293* (2013.01)

(58) Field of Classification Search
CPC .. H01M 8/04753; H01M 8/06; H01M 8/0606; H01M 8/0618; H01M 8/12; Y02E 60/50; Y02E 60/525
See application file for complete search history.

(56) References Cited

U.S. PATENT DOCUMENTS

2005/0129995 A1* 6/2005 Kato ................. C01B 3/323
429/170
2006/0263657 A1* 11/2006 Kelly et al. ................. 429/19

FOREIGN PATENT DOCUMENTS

| | | | |
|---|---|---|---|
| JP | 09-180743 A | | 7/1997 |
| JP | 2002-298889 A | | 10/2002 |
| JP | 2003007319 A | | 1/2003 |
| JP | 2004-247247 A | | 9/2004 |
| JP | 2004-281330 A | | 10/2004 |
| JP | 2006-302660 A | | 11/2006 |
| JP | 2006302660 A | * | 11/2006 |
| JP | 2009-099264 A | | 5/2009 |

\* cited by examiner

FUEL CELL SYSTEM AND METHOD FOR CONTROLLING FUEL CELL SYSTEM

CROSS REFERENCE TO RELATED APPLICATION

The present application claims priority to Japanese Patent Application No. 2012-133539, filed Jun. 13, 2012 and incorporated herein in its entirety.

TECHNICAL FIELD

The present invention relates to a fuel cell system using a solid oxide fuel cell and a method for controlling the fuel cell system, and in particular, to a technology to achieve reduction in size and improvement in efficiency of the whole system.

BACKGROUND

Generally, in a fuel cell system provided with a solid oxide fuel cell (SOFC), a hydrocarbon-based fuel and water are needed for reforming reaction. Therefore, in a conventional fuel cell system, gas (hereinafter, referred to as "anode off-gas") containing moisture which is discharged from an anode of the fuel cell is recirculated to a reformer using a circulation pump.

However, when the anode off-gas is recirculated, a circulation pump provided with a performance withstanding a high temperature comparable with the temperature of the anode off-gas becomes necessary. Furthermore, there is a problem that a volumetric flow rate becomes large due to high temperature of the anode off-gas, and dimensions of the circulation pump become large. In Japanese Patent Laid-Open No. 2006-302660, it is disclosed that for coping with this problem, since heat exchange is carried out between an oxidant (for example, air) introduced into a cathode of a fuel cell and the anode off-gas to be circulated, the anode off-gas supplied to the circulation pump can be cooled, heat resistance performance of the circulation pump can be lowered, and the volumetric flow rate of the anode off-gas can be decreased.

SUMMARY

However, since the above mentioned conventional example is configured to cool the anode off-gas by the oxidant to be supplied to the cathode, when a dynamic range of a required power generation output is wide like an in-vehicle fuel cell system, there is a problem that the larger the power generation output becomes, the more a temperature of the anode off-gas introduced into the circulation pump rises, and the required volumetric flow rate of the circulating gas increases, and the dynamic range required for the circulation pump becomes large.

The present invention is accomplished for solving such a conventional problem, and the object is to provide a fuel cell system capable of narrowing a dynamic range of a circulation pump.

One aspect of the present invention is a fuel cell system. This fuel cell system includes a circulation pump which circulates a part of anode off-gas discharged from an anode to supply the gas to a reforming unit, and introduces a reformed gas reformed by the reforming unit to an inlet of the anode; and a first heat exchange unit provided in an inlet side flow passage of the circulation pump, and configured to cool the reformed gas supplied to the circulation pump. Then, the first heat exchange unit is set so that the larger an output power of the fuel cell is, the more capability to cool the reformed gas supplied to the circulation pump increases.

Another aspect of the present invention is a method for controlling the fuel cell system. The method for controlling the fuel cell system performs control of reforming a fuel to generate a reformed gas; making a fuel cell generate an electric power by supplying the reformed gas by a circulation pump to an anode of the fuel cell having the anode and a cathode, and supplying an oxidant to the cathode; and cooling a reformed gas supplied to the circulation pump by a first heat exchange unit provided in an inlet side flow passage of the circulation pump. Here, the first heat exchange unit is set so that the larger an output power of the fuel cell is, the more capability to cool the reformed gas supplied to the circulation pump increases.

DESCRIPTION OF EMBODIMENTS

Hereinafter, an embodiment of the present invention will be described based on drawings.

[Description of First Embodiment]

Figure 1:
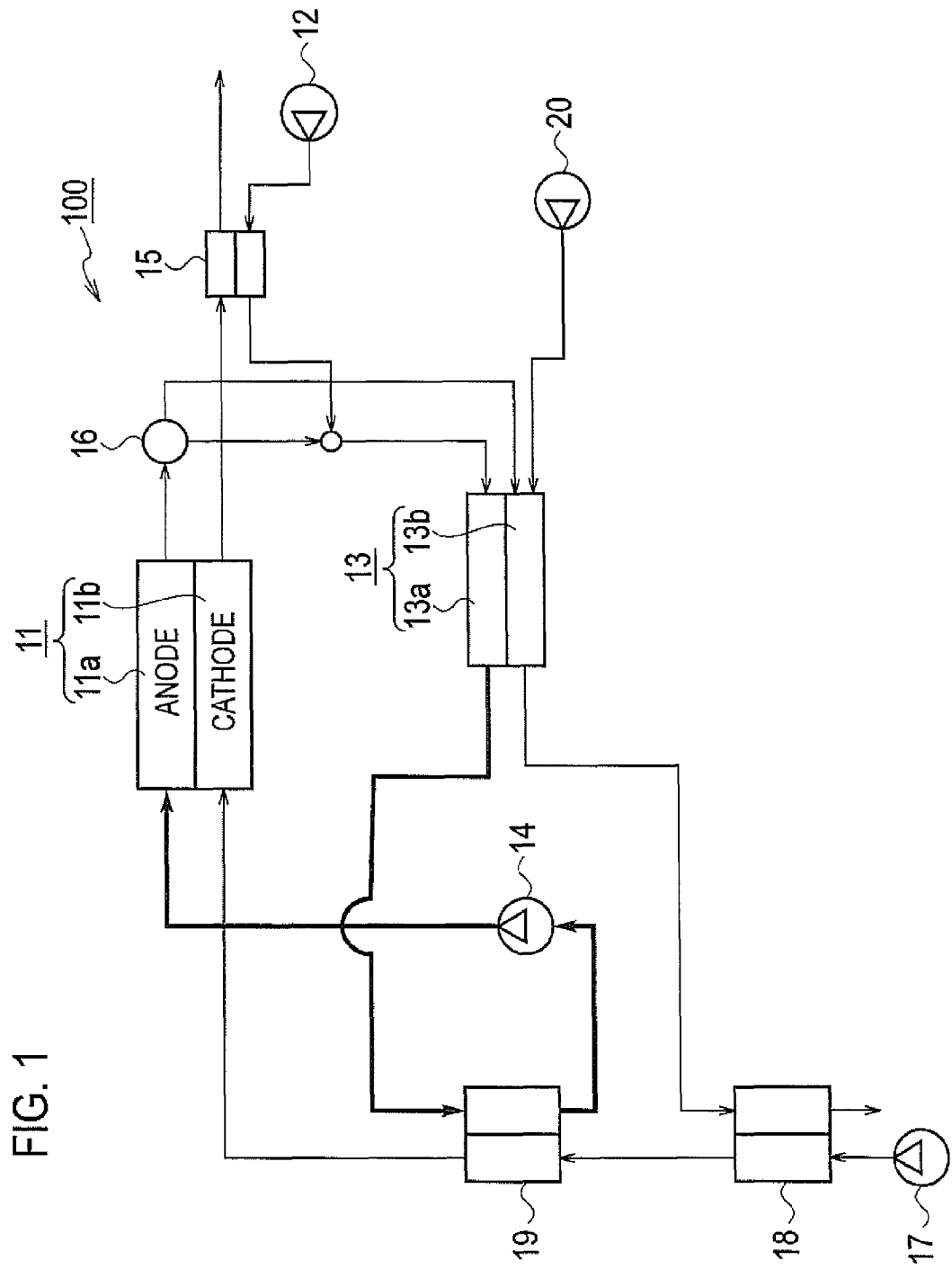
FIG. 1 is a block diagram illustrating a configuration of a fuel cell system according to a first embodiment of the present invention.

FIG. 1 is a block diagram illustrating a configuration of a fuel cell system according to a first embodiment of the present invention. As illustrated in FIG. 1, a fuel cell system 100 according to a first embodiment includes: a solid oxide fuel cell 11 provided with an anode 11a and a cathode 11b (hereinafter, referred to as "fuel cell 11"); a fuel pump 12 which supplies a hydrocarbon-based fuel; a heat exchange type reforming device 13 (reforming unit) which has a reformer 13a and a burner 13b, and reforms a fuel supplied from the fuel pump 12; and a circulation pump 14 which makes reformed gas reformed by the reformer 13a circulate to an inlet of the anode 11a.

The fuel cell system 100 further includes: a fuel evaporator 15 which evaporates a fuel supplied from the fuel pump 12 by heat of an exhaust gas of the cathode 11b and supplies the evaporated fuel to the reformer 13a; a flow dividing valve 16 which is connected to an outlet flow passage of the anode 11a, divides the exhaust gas (hereinafter, referred to as "anode off-gas") of the anode 11a into flows, and supplies one flow after the division to the reformer 13a and the other flow to the burner 13b; and a first air blower 20 which supplies air for burning to the burner 13b.

The fuel cell system 100 further includes: a second air blower 17 (oxidant supply unit) which supplies an air (oxidant) to the cathode 11b; a third heat exchanger (third heat exchange unit) 18 which heats the air sent out from the second air blower 17 by the exhaust gas of the burner 13b; and a first heat exchanger (first heat exchange unit) 19 where the air heated by this third heat exchanger 18 is supplied to a low temperature side thereof, and the reformed gas outputted from the reformer 13a is supplied to a high temperature side thereof.

Here, various kinds of specifications are set so that the first heat exchanger 19 and the third heat exchanger 18 may cool a temperature of the reformed gas within a range where the temperature of the reformed gas supplied to the circulation pump 14 is not less than a dew point (temperature where moisture is dew-condensed) of this reformed gas. Furthermore, also with respect to other system configurations, the temperature of the reformed gas is set so as not to be less than the dew point.

Next, operations of the fuel cell system 100 according to the first embodiment constituted as mentioned above will be described.

When the fuel cell system 100 is operated, air is supplied to the burner 13b of the heat exchange type reforming device 13 from the first air blower 20, and the anode off-gas discharged from the anode 11a is supplied to this burner 13b and is burned. Then, the exhaust gas of the burner 13b is supplied to the high temperature side of the third heat exchanger 18, and is discharged after that. Therefore, the air sent out from the second air blower 17 is heated by the heat of the exhaust gas of the burner 13b.

In addition, the exhaust gas discharged from the cathode 11b, by passing through the high temperature side of the fuel evaporator 15, heats the fuel sent out from the fuel pump 12, and evaporates this fuel.

Then, since a mixed gas of a part of the anode off-gas and the fuel which is sent from the fuel pump 12 and evaporated in the fuel evaporator 15 is supplied to the reformer 13a, and on the other hand, in the burner 13b, a part of the anode off-gas burns and generates heat, the reformed gas is generated by reforming reaction in the reformer 13a.

The reformed gas generated in the reformer 13a passes through the high temperature side of the first heat exchanger 19 and is supplied to the inlet of the circulation pump 14, and is supplied to the anode 11a of the fuel cell 11 by this circulation pump 14.

In addition, the air (oxidant) sent out from the second air blower 17 passes through the low temperature side of the third heat exchanger 18, and further, passes through the low temperature side of the first heat exchanger 19 and is heated, and is supplied to the cathode 11b of the fuel cell 11. That is, after heated by the exhaust gas of the burner 13b in the third heat exchanger 18 and heated by the reformed gas in the first heat exchanger 19, the air (oxidant) is supplied to the cathode 11b. Then, in the fuel cell 11, electrons are generated owing to chemical reaction of hydrogen and oxygen and are taken out as direct current.

At this time, since the reformed gas outputted from the reformer 13a passes through the high temperature side of the first heat exchanger 19, it is cooled by the air which passes through the low temperature side of this first heat exchanger 19 and is supplied to the cathode, and the temperature thereof is decreased. Thereafter, the reformed gas with the decreased temperature is supplied to the circulation pump 14. That is, it becomes possible to cool the reformed gas outputted from the reformer 13a and to supply it to the circulation pump 14. Therefore, it is possible to set a heat resistance performance of the circulation pump 14 to a lower temperature, and to achieve reduction in the device scale.

Furthermore, when a power generation output of the fuel cell 11 increases, an air amount sent out from the second air blower 17 increases, and thereby, an air amount supplied to the low temperature side of the first heat exchanger 19 increases, and a cooling capacity in the first heat exchanger 19 increases. Therefore, since the capacity to cool the reformed gas outputted from the reformer 13a increases, the reformed gas temperature can be made to be a lower temperature.

Figure 2:
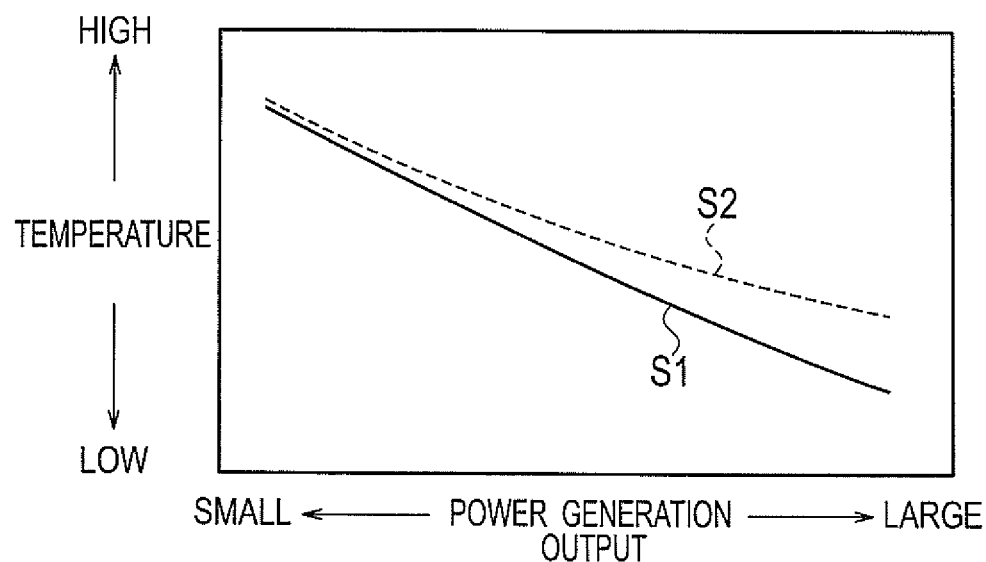
FIG. 2 is a characteristic diagram illustrating a relation between a generation power and a circulation pump inlet gas temperature in the fuel cell system according to the first embodiment of the present invention.

That is, when the power generation output becomes large, the air amount sent out from the second air blower 17 increases, and thereby, a temperature increase in the third heat exchanger 18 becomes small, and an air temperature of the low temperature side inlet of the first heat exchanger 19 gradually decreases as indicated in a curve S1 of FIG. 2. Therefore, the cooling capacity in the first heat exchanger 19 increases, and the temperature of the reformed gas sent out from the reformer 13a will decrease as the power generation output increases, as indicated in a curve S2 of FIG. 2.

Figure 3:
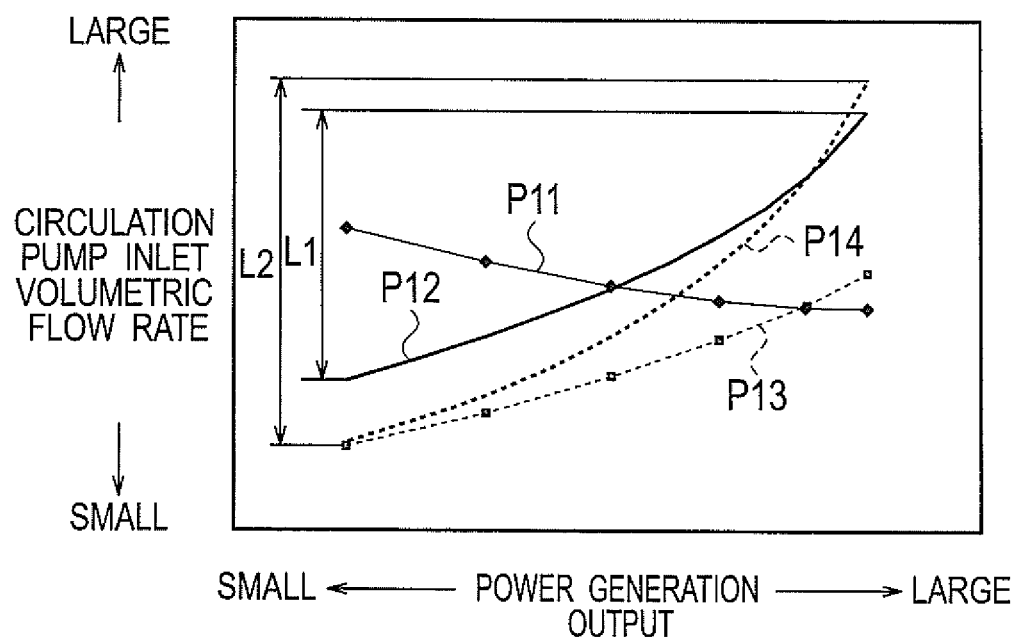
FIG. 3 is a characteristic diagram illustrating a relation between the generation power and the circulation pump inlet gas temperature and between the generation power and a gas volumetric flow rate at a circulation pump inlet, in the fuel cell system according to the first embodiment of the present invention.

FIG. 3 is a characteristic diagram illustrating a change of the reformed gas temperature at the inlet of the circulation pump 14 with respect to the power generation output of the fuel cell 11, and a change of a volumetric flow rate of the reformed gas at the inlet of the circulation pump 14 with respect to the power generation output of the fuel cell 11, and a curve P11 illustrates the inlet temperature of the circulation pump 14, and a curve P12 illustrates the inlet volumetric flow rate of the circulation pump 14. In addition, a curve P13 illustrates an inlet temperature of a circulation pump in the case where a conventional example is adopted, and a curve P14 illustrates an inlet volumetric flow rate of a circulation pump in the case where a conventional example is adopted.

As illustrated in the curves P13 and P14, in the conventional fuel cell system, as the power generation output of the fuel cell increases, the inlet temperature of the circulation pump tends to rise and the inlet volumetric flow rate of the circulation pump tends to rise. Therefore, a difference between the volumetric flow rate when the power generation output is the maximum and the volumetric flow rate when the power generation output is the minimum becomes L2, and it is necessary to use the circulation pump having a large dynamic range.

In contrast to this, in the fuel cell system 100 according to the present embodiment, the inlet temperature of the circulation pump 14 decreases as the power generation output of the fuel cell 11 increases as illustrated in the curve P11, and resulting from this, rising of the inlet volumetric flow rate of the circulation pump 14 is suppressed as illustrated in the curve P12. Therefore, a difference between the volumetric flow rate when the power generation output is the maximum and the volumetric flow rate when the power generation output is the minimum becomes L1, and it is turned out that a circulation pump having a relatively small dynamic range as compared with a conventional circulation pump can be used.

In this way, in the fuel cell system 100 according to the first embodiment, since the temperature of the anode off-gas is high when a generation power of the fuel cell 11 is small, the reformed gas can be supplied to the anode 11a of the fuel cell 11 via the circulation pump 14, while moisture contained in the reformed gas sent out from the reformer 13a is not condensed. Therefore, a carbon deposition on an anode surface can be prevented without internal reforming and shift reaction on the anode surface being inhibited. Furthermore, since a moisture amount in the anode off-gas also can be secured sufficiently, moisture required for reforming can be supplied to the reformer 13a in which a part of the anode off-gas is introduced, and the carbon deposition in the reformer 13a can be prevented.

In addition, since the cooling capacity of the first heat exchanger 19 increases as the generation power of the fuel cell 11 increases, a temperature of circulating gas which flows into the circulation pump 14 decreases. As the result, a volume density of the circulating gas can be increased (increase in volumetric flow rate can be suppressed), and a width (dynamic range) of the volumetric flow rate of the circulating gas in a range of the generation power of the fuel cell 11 can be narrowed. Furthermore, even when the generation power of the fuel cell 11 increases and the temperature of the circulating gas decreases, specifications of the first heat exchanger 19 and the third heat exchanger 18 are set so that the temperature of this circulating gas may become no less than a dew point temperature, and thereby, water condensation at the inlet of the circulation pump 14 can be prevented. As the result, reduction in size and reduction in energy consumption of the circulation pump 14 can be achieved.

Furthermore, a flow rate of the exhaust gas discharged from the fuel cell 11 increases as the generation power increases, and in association with this, a flow rate of the air (oxidant) supplied to the fuel cell 11 also increases. On the other hand, since a heat exchange area of the third heat exchanger 18 for raising a temperature of the air sent out from the second air blower 17 is fixed at a constant value, the temperature of the air after heat exchange decreases as the generation power increases, and it becomes possible to reduce the temperature of the reformed gas supplied to the circulation pump 14.

In addition, since a thermal energy of the exhaust gas can be supplied to the air (oxidant) introduced to the cathode via the third heat exchanger 18 by supplying the exhaust gas in the system to the high temperature side of the third heat exchanger 18, the thermal energy to be discarded can be decreased and a system efficiency can be improved.

Furthermore, since an outlet gas of the burner 13b of the heat exchange type reforming device 13 is supplied to the third heat exchanger 18 as the exhaust gas of the fuel cell 11, the energy of the anode off-gas to be unused can be utilized for the reforming reaction (endothermic reaction), and furthermore, since this heat can be supplied to the air introduced into the cathode 11b, the thermal energy to be discarded can be decreased and the system efficiency can be improved.

In addition, since the temperature of the reformed gas supplied to the circulation pump 14 at the time of minimum output of the fuel cell 11 can be set so as to exceed the dew point of this reformed gas by setting suitably specifications of the first heat exchanger 19 and the third heat exchanger 18, the moisture contained in the reformed gas can be prevented from being condensed even when the power generation output of the fuel cell 11 has changed. Therefore, not only the carbon deposition or the like on the anode surface can be prevented without the internal reforming and shift reaction on the anode surface being inhibited, but also the moisture amount in the anode off-gas is also secured sufficiently, and thereby, it becomes possible to supply the moisture required for the reforming to the reformer 13a where a part of the anode off-gas is introduced, and the carbon deposition in the reformer 13a can be prevented.

[Description of Second Embodiment]

Figure 4:
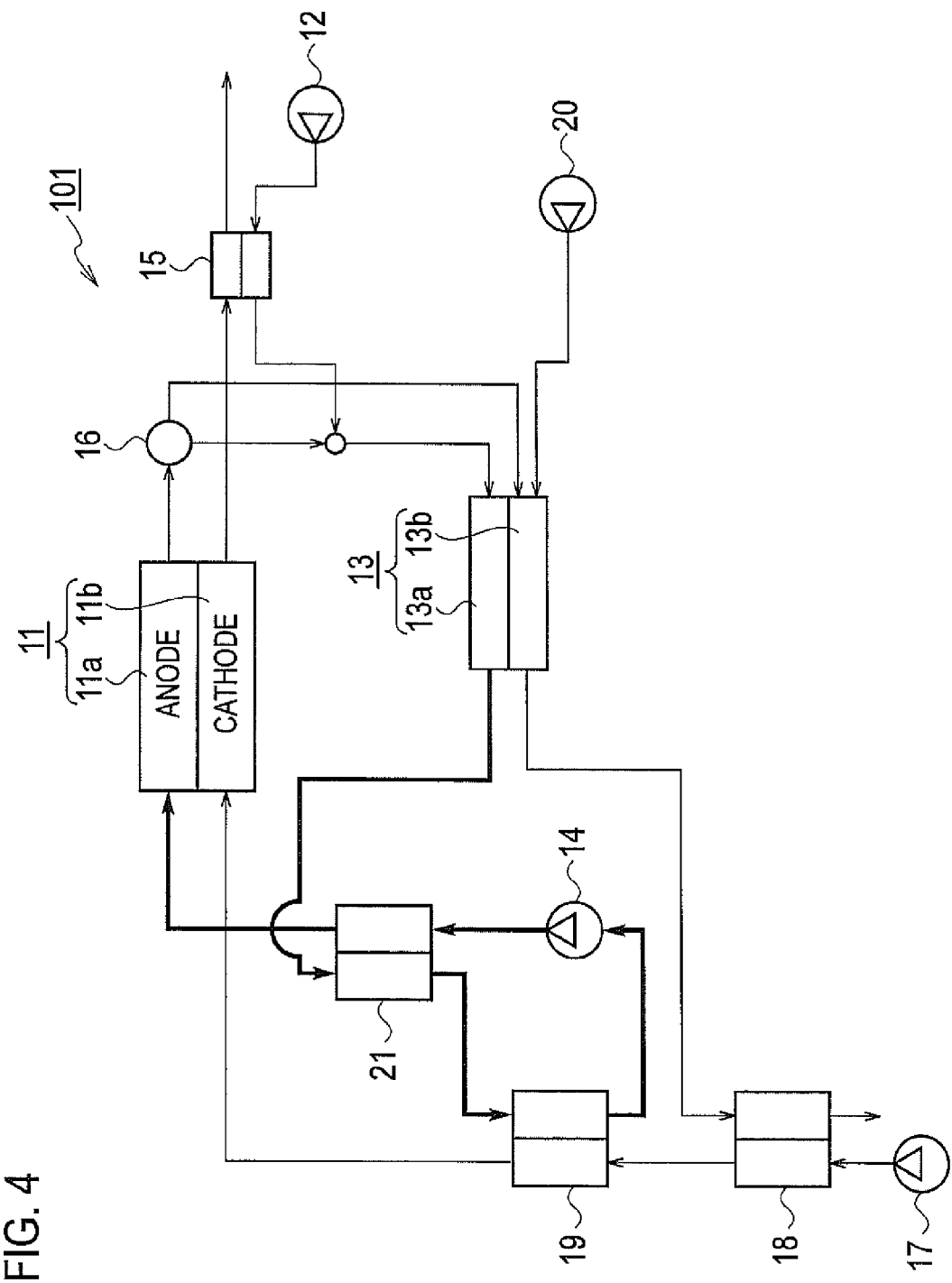
FIG. 4 is a block diagram illustrating a configuration of a fuel cell system according to a second embodiment of the present invention.

Next, a second embodiment of the present invention will be described. FIG. 4 is a block diagram illustrating a configuration of a fuel cell system according to the second embodiment. As illustrated in FIG. 4, a fuel cell system 101 according to the second embodiment, as compared with the fuel cell system 100 illustrated in FIG. 1 mentioned above, is different in that a second heat exchanger (second heat exchange unit) 21 is provided in an outlet side conduit of the circulation pump 14. Since configurations other than that are the same as those of FIG. 1, the same symbols are given, and configuration descriptions will be omitted.

As for the second heat exchanger 21, the reformed gas outputted from the reformer 13a is supplied to the high temperature side, and the reformed gas outputted from the circulation pump 14 is supplied to the low temperature side. Therefore, the reformed gas outputted from the reformer 13a is cooled in the second heat exchanger 21, and furthermore, is cooled further in the first heat exchanger 19. Thereinafter, the reformed gas is supplied to the circulation pump 14. Then, the reformed gas outputted from the circulation pump 14, after being heated by the second heat exchanger 21, is supplied to the anode 11a of the fuel cell 11.

In this way, in the fuel cell system 101 according to the second embodiment, the same effects as in the first embodiment mentioned above can be achieved. Furthermore, because the temperature of the reformed gas is made to be decreased in two steps of the second heat exchanger 21 and the first heat exchanger 19, and a fluid flowing in the low temperature side of the second heat exchanger 21 is the reformed gas sent out from the circulation pump 14, it becomes possible to give the thermal energy removed by cooling to the reformed gas introduced into the anode 11a. Therefore, the thermal energy to be discarded can be decreased and the system efficiency can be increased.

[Description of Third Embodiment]

Figure 5:
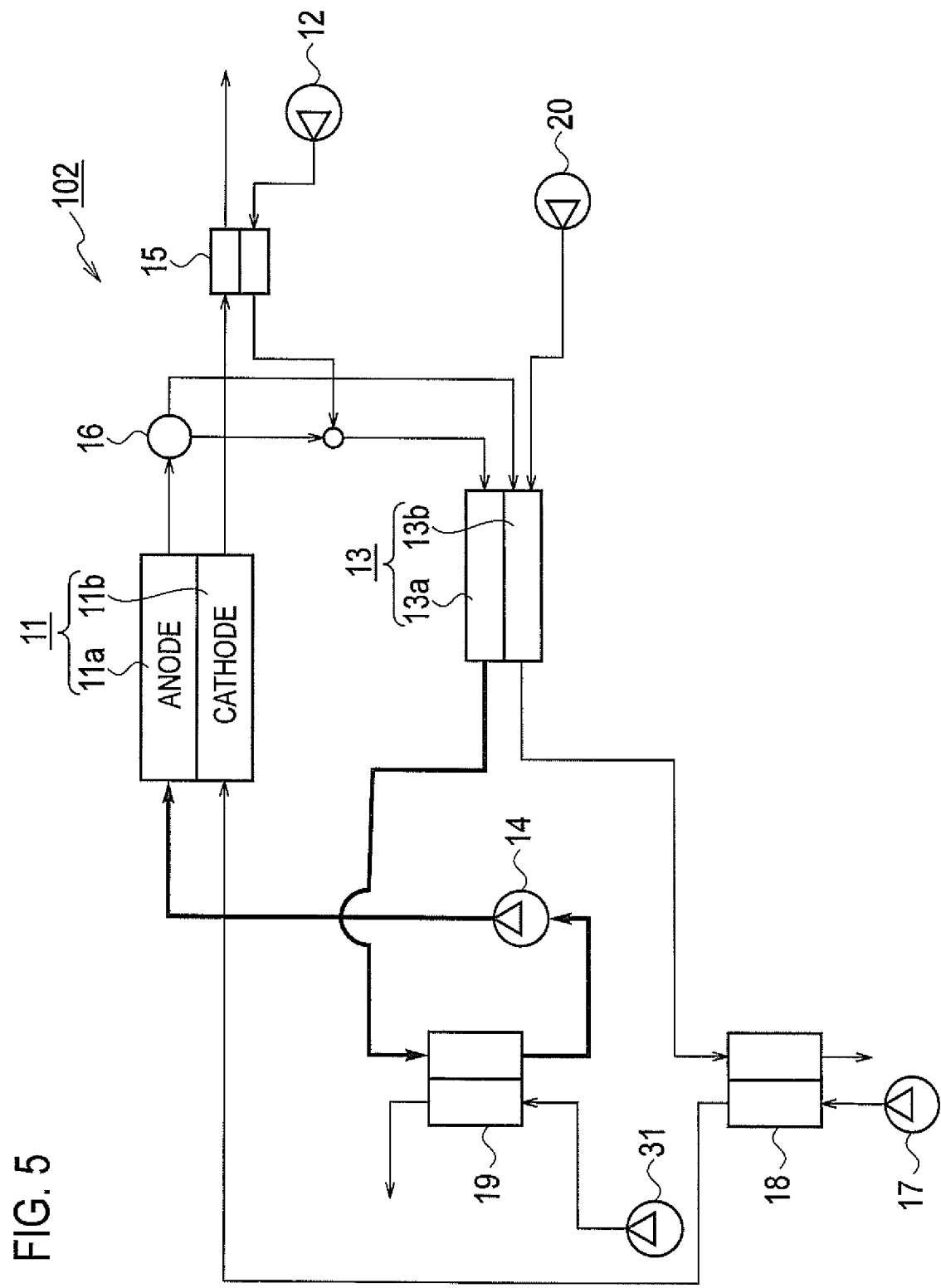
FIG. 5 is a block diagram illustrating a configuration of a fuel cell system according to a third embodiment of the present invention.

Next, a third embodiment of the present invention will be described. FIG. 5 is a block diagram illustrating a configuration of a fuel cell system 102 according to the third embodiment. As illustrated in FIG. 5, a fuel cell system 102 according to the third embodiment is different, as compared with the fuel cell system 100 illustrated in above-mentioned FIG. 1, in that a third air blower 31 is provided in the low temperature side of the first heat exchanger 19, and in that the low temperature side output of the third heat exchanger 18 is connected to the cathode 11b. Since configurations other than that are the same as those of the fuel cell system 100 illustrated in FIG. 1, the same symbols are given, and configuration descriptions will be omitted.

As for the third air blower 31, a flow rate of the air (fluid) to be sent out can be adjusted suitably by a control using a not-illustrated control unit. Therefore, a flow rate of the air sent out from the third air blower 31 is made to increase as the power generation output of the fuel cell 11 increases, and thereby, the cooling capacity in the first heat exchanger 19 can be improved, and the same effects as in the first embodiment mentioned above can be achieved.

In addition, when a flow rate of the air sent out from the third air blower 31 is assumed to be Qc and an amount of the reformed gas which flows into the circulation pump 14 is assumed to be Qr, the ratio "Qc/Qr" is made to be increased as the output of the fuel cell 11 increases, and thereby, the cooling capacity of the reformed gas owing to the first heat exchanger 19 can be improved. Therefore, when the power generation output of the fuel cell 11 increases, the temperature of the reformed gas which flows into the circulation pump 14 can be decreased, and the dynamic range of the circulation pump can be made small.

[Description of Fourth Embodiment]

Figure 6:
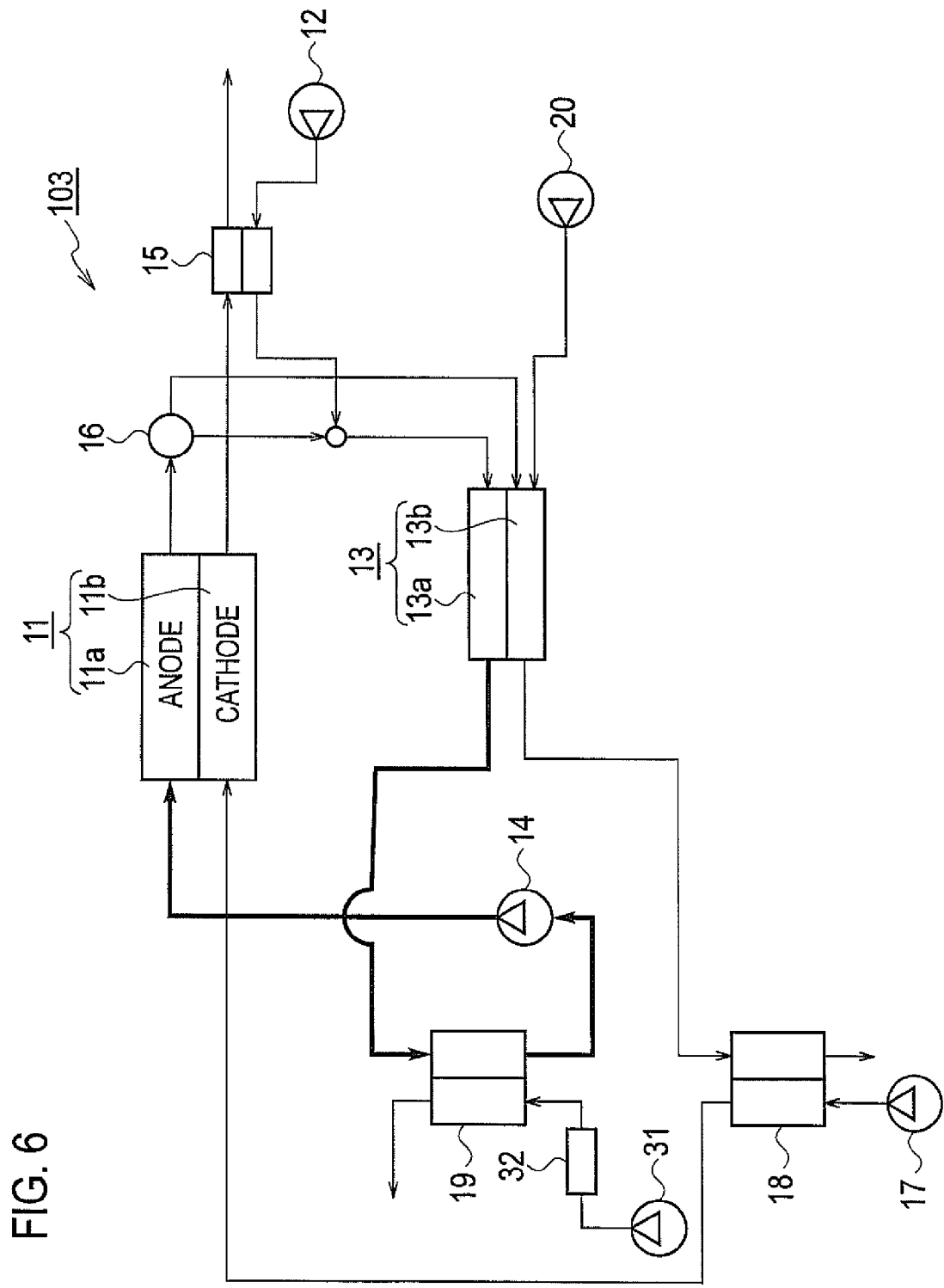
FIG. 6 is a block diagram illustrating a configuration of a fuel cell system according to a fourth embodiment of the present invention.

Next, a fourth embodiment of the present invention will be described. FIG. 6 is a block diagram illustrating a configuration of a fuel cell system 103 according to the fourth embodiment. As illustrated in FIG. 6, the fuel cell system 103 according to the fourth embodiment is different in that a heating body 32 is provided in the output side of the third air blower 31 as compared with the fuel cell system 102 illustrated in above-mentioned FIG. 5. Since configurations other than that are the same as those of the fuel cell system 102 illustrated in FIG. 5, the same symbols are given, and configuration descriptions will be omitted.

The heating body 32 is a combustion burner or an electric heater, for example, and heats the air sent out from the third air blower 31, and supplies the heated air to the low temperature side of the first heat exchanger 19. In this way, heat exchanging efficiency in the first heat exchanger 19 can be changed suitably.

Specifically, an amount of heat supplied to the air per unit flow rate from the heating body 32 is made small in accordance with the increase in the power generation output of the fuel cell 11. Thereby, since the temperature of the air which flows into the low temperature side of the first heat exchanger 19 decreases, the temperature of the reformed gas supplied to the inlet of the circulation pump 14 can be decreased.

In addition, when the amount of heat generated by the heating body 32 is assumed to be constant, the amount of the anode off-gas circulated via the flow dividing valve 16 and an amount of fuel supplied via the fuel pump 12 increase as the generation power of the fuel cell 11 increases, and as a result, the flow rate of the reformed gas outputted from the reformer 13a increases. Therefore, the temperature of the air supplied to the low temperature side of the first heat exchanger 19 is made to decrease by increasing the flow rate of the third air blower 31, and the cooling capacity at the time of cooling the reformed gas temperature is increased. Thereby, the temperature of the reformed gas supplied to the circulation pump 14 can be decreased.

On the other hand, when the flow rate of the air sent out from the third air blower 31 is constant, the amount of heat generated by the heating body 32 is made to decrease as the output of the fuel cell 11 increases. Thereby, the temperature of the reformed gas supplied to the circulation pump 14 can be decreased. Furthermore, when a range of an output voltage of the fuel cell 11 is wide like an in-vehicle fuel cell, by controlling both of the temperature of the heating body 32 and the amount of the air sent out from the third air blower 31, the cooling capacity of the reformed gas in the first heat exchanger 19 is made to increase as the output of the fuel cell 11a increases, and the temperature of the reformed gas supplied to the circulation pump 14 can be decreased.

In this way, in the fuel cell system 103 according to the fourth embodiment, by controlling at least one of the output flow rate of the third air blower 31 and the amount of heat generated by the heating body 32, the cooling capacity of the reformed gas supplied to the circulation pump 14 can be changed suitably. Therefore, the same effects as those of the first embodiment mentioned above can be achieved, and in addition to that, the temperature of the reformed gas supplied to the circulation pump 14 can be made relatively high when the power generation output of the fuel cell 11 is low. Furthermore, the temperature of the reformed gas can be decreased as the generation power increases. As the result, the change of the volumetric flow rate of the reformed gas supplied to the circulation pump 14 can be made to have the characteristics illustrated in the curve P12 of FIG. 3, and the dynamic range of the circulation pump 14 can be made small.

Although examples where air is used as an oxidant has been illustrated in each embodiment mentioned above, the present invention is not limited to this, and gas containing oxygen other than air can be used.

Although the fuel cell system of the present invention has been described based on embodiments as mentioned above, the present invention is not limited to these. Configurations of each part can be replaced by any configurations having the same function.

The present invention can be used for achieving reduction in size and reduction in cost of the device in an in-vehicle fuel cell, for example.

In the fuel cell system according to the present invention, the reformed gas outputted from the reforming unit is cooled in the first heat exchange unit, and furthermore, the reformed gas, while supplied to the circulation pump, is made to be circulated to the anode of the fuel cell. In addition, since the larger the output power of the fuel cell is, the more the capability to cool the reformed gas supplied to the circulation pump increases, the temperature of the reformed gas can be decreased as the output of the fuel cell increases, and the dynamic range of the circulation pump can be narrowed.

The invention claimed is:

1. A fuel cell system, comprising:
a fuel cell having an anode and a cathode;
a fuel supply flow passage connecting to an anode inlet of the fuel cell;
a fuel exhaust flow passage connecting to an anode outlet of the fuel cell;
a fuel circulation flow passage branched from the fuel cell exhaust flow passage at a first joint portion and jointed to the fuel supply flow passage at a second joint portion;
a reforming unit installed in the fuel supply flow passage between the second joint portion and the anode inlet of the fuel cell, to generate a reformed gas;
a circulation pump installed in the fuel supply flow passage between the reforming unit and the anode inlet of the fuel cell; and
a first heat exchange unit installed in the fuel supply flow passage between the reforming unit and the circulation pump, wherein
the first heat exchange unit is set so that the larger an output power of the fuel cell is, the more a temperature of a fluid supplied to a low temperature side of the first heat exchange unit decreases and the more a capability to cool the reformed gas supplied to the circulation pump increases.

2. The fuel cell system according to claim 1, wherein
the fluid supplied to the low temperature side of the first heat exchange unit is an oxidant which is sent out from an oxidant supply unit and is supplied to the cathode, and a temperature of the oxidant is raised at an upstream of the first heat exchange unit by heat exchange between the oxidant and an exhaust gas of the fuel cell.

3. The fuel cell system according to claim 2, wherein
the exhaust gas is an outlet gas of a burner for burning an uncirculated anode off-gas.

4. The fuel cell system according to claim 2, wherein
the reforming unit has a burner to supply a heat flow required for reforming, and the exhaust gas is a gas discharged from the burner after an uncirculated anode off-gas is burned in the burner.

5. The fuel cell system according to claim 1, further comprising:
a second heat exchange unit configured to carry out heat exchange between the reformed gas outputted from the reforming unit and an outlet gas of the circulation pump, wherein
the reformed gas outputted from the reforming unit is supplied to the circulation pump via a high temperature side of the second heat exchange unit and a high temperature side of the first heat exchange unit, and
a reformed gas sent out from the circulation pump is supplied to the anode via a low temperature side of the second heat exchange unit.

6. The fuel cell system according to claim 1, wherein a ratio between a flow rate of a fluid flowing in a low temperature side of the first heat exchange unit and an amount of a gas flowing into the circulation pump is made to vary in accordance with an output of the fuel cell.

7. The fuel cell system according to claim 1, wherein when a power generation output of the fuel cell is a minimum output, a system configuration is configured so that a temperature of an inlet gas of the circulation pump becomes a temperature exceeding a dew point of the inlet gas.

8. A method for controlling a fuel cell system including
a fuel cell having an anode and a cathode;
a fuel supply flow passage connecting to an anode inlet of the fuel cell;
a fuel exhaust flow passage connecting to an anode outlet of the fuel cell; and
a fuel circulation flow passage branched from the fuel cell exhaust flow passage at a first joint portion and jointed to the fuel supply flow passage at a second joint portion, the method for controlling the fuel cell system, comprising the steps of:
reforming a fuel by a reforming unit installed in the fuel supply flow passage between the second joint portion and the anode inlet of the fuel cell, to generate a reformed gas;
circulating the reformed gas by a circulation pump installed in the fuel supply flow passage between the reforming unit and the anode inlet of the fuel cell such that the circulation pump is provided after an outlet of the reforming unit and before the anode inlet, and the reformed gas circulates via the circulation pump; and
cooling the reformed gas supplied to the circulation pump by a first heat exchange unit installed in the fuel supply flow passage between the reforming unit and the circulation pump, wherein
the first heat exchange unit is set so that the larger an output power of the fuel cell is, the more a temperature of a fluid supplied to a low temperature side of the first heat exchange unit decreases and the more a capability to cool the reformed gas supplied to the circulation pump increases, and
the temperature of the reformed gas at the inlet of the circulation pump decreases due to the increase of the capability to cool the reformed gas supplied to the circulation pump.

9. The fuel cell system according to claim 1,
wherein the circulation pump is provided after an outlet of the reforming unit and before the anode inlet, and the reformed gas circulates via the circulation pump; and
wherein the temperature of the reformed gas at the inlet of the circulation pump decreases due to the increase of the capability to cool the reformed gas supplied to the circulation pump.

10. The fuel cell system according to claim 9, further comprising:
a blower configured to adjust a flow amount of the fluid supplied to the low temperature side of the first heat exchange unit, and
a control unit configured to control the blower so that the larger an output power of the fuel cell is, the larger the flow amount of the fluid supplied to the low temperature side of the first heat exchange unit is.

11. The fuel cell system according to claim 9, further comprising:
a heating body configured to adjust the temperature of the fluid supplied to the low temperature side of the first heat exchange unit, and
a control unit configured to control the heating body so that the larger an output power of the fuel cell is, the more the temperature of the fluid supplied to the low temperature side of the first heat exchange unit decreases.

12. A method for controlling a fuel cell system including
a fuel cell having an anode and a cathode;
a fuel supply flow passage connecting to an anode inlet of the fuel cell;
a fuel exhaust flow passage connecting to an anode outlet of the fuel cell; and
a fuel circulation flow passage branched from the fuel cell exhaust flow passage at a first joint portion and jointed to the fuel supply flow passage at a second joint portion,
the method for controlling the fuel cell system, comprising the steps of:
reforming a fuel by a reforming unit installed in the fuel supply flow passage between the second joint portion and the anode inlet of the fuel cell, to generate a reformed gas;
circulating the reformed gas by a circulation pump installed in the fuel supply flow passage between the reforming unit and the anode inlet of the fuel cell; and
cooling the reformed gas supplied to the circulation pump by a first heat exchange unit installed in the fuel supply flow passage between the reforming unit and the circulation pump, wherein
the first heat exchange unit is set so that the larger an output power of the fuel cell is, the more a temperature of a fluid supplied to a low temperature side of the first heat exchange unit decreases and the more a capability to cool the reformed gas supplied to the circulation pump increases.

* * * * *